April 29, 1941.  L. L. GAGNON ET AL  2,240,157
OPHTHALMIC LENS
Filed May 25, 1938
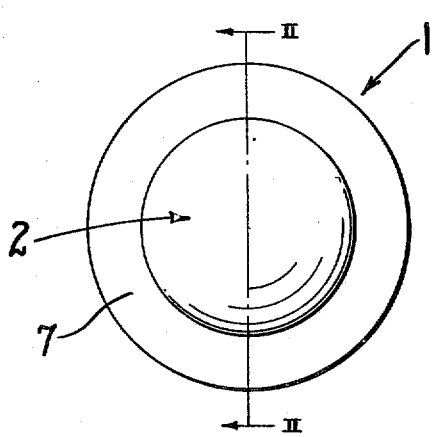
Fig. I
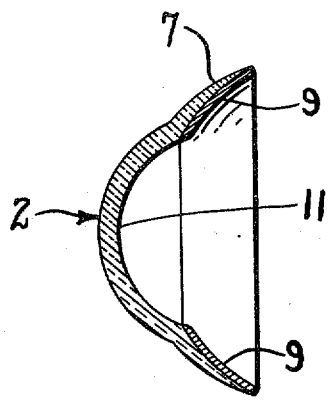
Fig. II
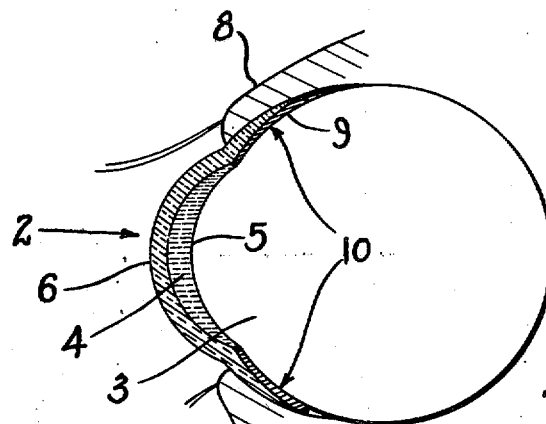
Fig. III
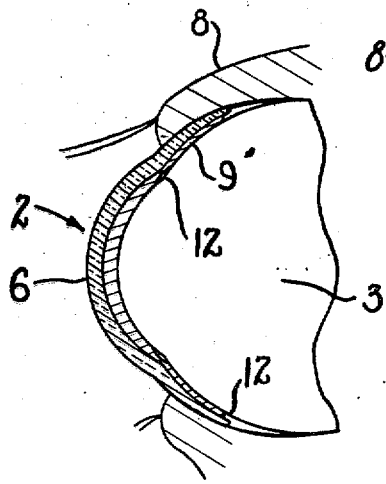
Fig. IV
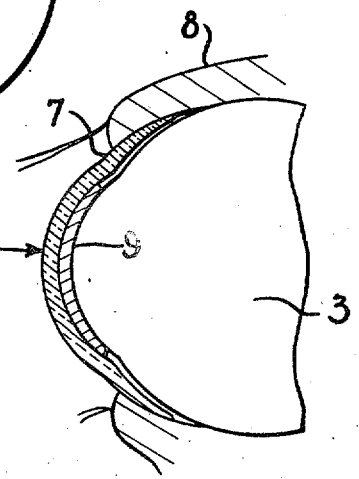
Fig. V
INVENTOR
LOUIS L. GAGNON
HAROLD R. MOULTON
BY Harry H. Styll
ATTORNEY Patented Apr. 29, 1941

2,240,157

UNITED STATES PATENT OFFICE 2,240,157

OPHTHALMIC LENS

Louis L. Gagnon and Harold R. Moulton, Southbridge, Mass., assignors to American Optical Company, Southbridge, Mass., a voluntary association of Massachusetts Application May 25, 1938, Serial No. 210,005

3 Claims. (Cl. 88—54.5)

This invention relates to opthalmic lenses and has particular reference to contact lenses.

One of the principal objects of the invention is to provide an ophthalmic lens of the contact type with a portion fitted to the eye of the individual for which the lens is designed.

Another object is to provide new and improved means of fitting contact lenses to the eyes of an individual.

Another object is to provide an ophthalmic lens of the contact type having an eye contacting surface which may be formed to such a curvature as to intimately and accurately fit the lens contacting portion of an individual's eye.

Another object is to provide a contact lens which will greatly reduce eye irritation due to the use of contact lenses by providing a more desirable fit between the lens and the eye.

Another object is to provide a contact lens which may be fitted to the particular contours of an individual's eye very accurately, quickly and with little or no discomfort to the person being fitted.

Another object is to provide an ophthalmic lens of the contact type having means associated therewith whereby it may be fitted to the eye of an individual, said means comprising a layer of deformable material on the eye contacting portion of said lens, which may be caused to flow or shape itself to fit desirably the contacting portion of said eye and thereafter be set to retain said shape.

Still another object is to provide an ophthalmic lens of the contact type having means associated therewith whereby it may be fitted to the eye of an individual, said means comprising a layer of deformable material, certain portions of which are removed to provide a relieving clearance and provide edge portions which will not press unnecessarily on the eye.

Other objects and advantages of the invention will become apparent from the following description taken in connection with the accompanying drawing and it will be apparent that many changes may be made in the details of construction, arrangement of parts and methods shown and described without departing from the spirit of the invention as expressed in the accompanying claims.

We, therefore, do not wish to be limited to the exact details, arrangements and methods shown and described, as the preferred forms only have been given by way of illustration.

Referring to the drawing:

Fig. I is a front elevation of a lens embodying this invention;

Fig. II is a sectional view taken on line II—II of Fig. I;

Fig. III shows the sectional view of Fig. II as it would appear in position on an eye, having the eye and lids in section;

Fig. IV is a sectional view of an alternate structure; and

Fig. V is a sectional view of another alternate structure.

Numerous types of contact lenses, that is, lenses which when in use are positioned partially beneath the eyelids and in contact with the eyeball, have been made in the past and various attempts have been made to provide a lens which would be comfortable to wear.

One of the greatest difficulties experienced was that of obtaining a sufficiently intimate fit of the lens over the eyeball. This is an important point, since this type of lens is supported by its contact with the eyeball, and unless an accurate and intimate fit of the supporting portion is obtained, the lens is liable to loosen and either fall out or shift its position on the eyeball, or exert uneven pressure and cause irritation and discomfort. Most contact lenses have a central portion of a deeper curve or cupping than the remainder, for fitting over the corneal portion of the eye. It will be seen that if a lens were to shift its position on an eye, the cornea would be liable to injury by the edge of this deeper cupped portion. Most contact lenses move with the eyeball, and since this motion tends to loosen or throw off the lens, an intimate and accurate fit is necessary to produce desirable results.

In most instances, the method of fitting a contact lens has been as follows: The corneal curve is measured with a suitable measuring instrument of the type known in the art, or by other suitable means. This gives the examiner a general idea of the curve which should be on the corneal portion of the lens. With this to start from, the examiner tries various lenses until he finds one which comes the closest to fitting properly on the scleral portion of the eye. This lens is left on and a trial frame used to determine the refractive error of the eye with that particular lens on it. The correction is computed and then ground on the corneal portion of the contact lens. The examiner uses an instrument such as the slit lamp to determine whether a lens fits on the sclera. This is shown by the blood vessels which, on one side of a point of pressure, are distended and red, and on the other are notably white.

The scleral portion of an eye varies considerably in curvature and contour in a single eye, and even more so in different eyes. In order to produce a lens having a portion which will intimately fit the varied contours of the sclera, measurements or impressions must be taken in all directions and the task of transferring the measurements or impressions to an actual surface which must intimately fit the measured portion involves difficult, painstaking and expensive operations. The lengthy fitting and trying operations are painful and time consuming for the patient. Mechanical difficulties and possibilities of error are considerable, even for a man of more than ordinary skill.

The present invention obviates the above difficulties by supplying the supporting portions of the lens with a layer of pliable, plastic-like material whereby the lens may be pressed against the eye and the contours of the eye at the precise points of desired contact and support will be impressed in this material as in making a cast or mold. The lens may be so treated as to harden while remaining on the eye, or it may be removed and hardened so as to set the supporting portions in the exact contours which were impressed in it by the eye itself. Thus, with one direct molding operation, a lens is provided which fits desirably and precisely accurately the eye on which it is intended to be used.

Referring more particularly to the drawing in which like characters of reference designate like parts throughout the several views, the lens 1 embodying the invention comprises a central visual portion 2 adapted to overly the cornea of an eye 3 and act as part of the optical system of said eye, a peripheral, lens supporting portion 7 attached to or integral with the visual portion 2 and adapted to support same on an eye by lying partially under the eyelids 8 and over a portion of the sclera 10 of the eye, and an attached moldable layer 9 substantially covering the inner surface of the supporting portion 7 and adapted to acquire and retain an accurate impression or mold of that part of the sclera 10 which the lens supporting portion 7 overlies, and to retain the lens on the eye by means of its self-obtained fit therewith. When the lens 1 is in use, a liquid 4, such as isotonic salt solution which may comprise water, boric acid and sodium chloride, or a solution simulating the secretion of the tear glands, is placed between the visual portion 2, and the corneal surface 5 of an eye. This liquid possesses substantially the same index of refraction as the cornea 5 of the eye. This causes the corneal surface 5 to effectively disappear, and the outer optically corrected surface 6 of the visual portion 2 to take its place in the optical system of the eye, thus compensating for whatever error had been produced by any irregularities or incorrect curvatures of said corneal surface 5.

The central visual portion 2 is formed of transparent lens media, such as glass, or of a material having the characteristics of methyl methacrylate polymer, or any other suitable material, and is formed so as to have the prescriptive characteristics required by the individual for whom the lens is to be made.

The scleral or supporting portion 7 may be formed integral with or separate from the central or corneal portion 2, in which latter case it is later suitably joined to the central portion 2, as by suitable adhesives, fusion, solvents or mechanical means, the said portion 7 being formed to the general contour shape and size of the portion of the sclera 10 of an eye 3 which it is to overlie, and so as to fit readily under the eyelids 8, when in operative position.

The surfaces on the visual portion 2 and supporting portion 7 may be formed by abrading, or said portions may be molded with the desired finished surfaces thereon. It is apparent that, if desired, the portions 2 and 7 may be formed of glass and the moldable layer 9 of a material having the characteristics of methyl methacrylate, with the layer 9 joined with the portion 7 by using an adhesive such as methyl methacrylate plasticized with a plasticizer of the type of esters of phthalic acid, or by other suitable means. Material having the characteristics of methyl methacrylate is taken as the prototype of a clear transparent water and acid resistant synthetic resinous material. When joining the glass and material having the characteristics of methyl methacrylate, the adhesion may be aided by roughening the inner surface of the supporting portion 7.

The portions 2 and 7 when completed have relatively hard and rigid characteristics thereby retaining the shape to which they are formed.

The corneal portion 2 is provided with a carefully formed outer surface 6 which acts as one of the main controlling elements of the prescriptive characteristics of the lens, and of the optical system of the eye. The inner surface 11 may be left in a relatively rough state, since for practical purposes the index of refraction of the liquid 4 is made substantially equal to that of the cornea 5, and differs only slightly from that of the visual portion 2, thus substantially compensating for any irregularities of the inner surface 11. In some instances, however, it may be desirable and/or essential to use the inner surface 11 as a controlling part of the optical system of the eye or lens. In such cases, this surface should be as optically perfect and controlled as to its surface curvature as the outer surface 6.

The lens and supporting portion formed as stated above may be fitted to the eye by one of the following procedures:

As illustrated in Figs. II and III, the inner surface of the supporting portion 7 which overlies the sclera of the eye may be provided with a relatively thin coating 9 of plastic material such as partially polymerized methyl methacrylate which has the property of being impressionable when in its soft and plastic state. If desired, the inner surface of the portion 7, particularly when it is formed of glass, may be provided with a suitable adhesive such as plasticized methyl methacrylate prior to placing the relatively thin coating or layer 9 thereon. In instances where the portion 7 is formed with material having the characteristics of methyl methacrylate, the inner surface of the portion 7 may be treated with a permanent plasticizer, such as esters of phthalic acid or the like, or ethyl acetate, or other suitable solvent. The coating or layer 9 will thereby be caused to adhere to the inner surface of portion 7. The use of phthalic esters causes the coating 9 to have an under layer or layer adjacent the contiguous surfaces of said portion 9 and portion 7 which remains slightly yielding. The inner surface 11, if desired, may be provided with a relatively thin layer of latex prior to placing the coating or layer 9 on the inner surface of the portion 7. This will tend to prevent the partially polymerized layer 9 from flowing over on to the inner surface 11 during the completing of the lens.

The lens having the partially polymerized or impressionable surface 9 thereon is held by a suitable suction holder. A solution such as an isotonic salt solution or the like, preferably containing a local anesthetic, such as butyn or the like, is placed in the eye and the lens 1 is then inserted and held in proper axial relation with the eye. A slight pressure is exerted on the lens to cause the layer 9 to assume the shape of the sclera of the eye. The lens is then removed from the eye end polymerization of the layer or coating 9 is then completed by subjecting it to heat of a proper temperature of 85° C. or less. Completion of polymerization permanently sets the impression made on the layer 9 by the sclera 10 of the eye so that the said layer will permanently retain this shape. If a coating of latex has been used on the inner layer 11 the said coating is then removed. The edges of the layer, after polymerization has been completed, may be smoothed. The resulting lens will have a relatively intimate comfortable fit with the sclera of the eye and will more positively tend to retain its fitted position with the eye.

It is to be understood that when in use a solution such as an isotonic water solution, comprising water, boric acid and sodium chloride, is placed in the lens prior to positioning the lens on the eye. The solution will flow outwardly in the act of positioning the lens on the eye so that the cavity between the inner surface 11 and surface 5 of the cornea of the eye will be completely filled with the solution 4.

An alternative method is to plasticize the inner surface of the portion 7 with a volatile plasticizer, such as petroleum ether or the like, not miscible with water. The lens thus treated is placed in desired axial position on the eye with a slight pressure exerted to cause the plasticized inner surface to assume the shape of the sclera and is allowed to remain on the eye a length of time sufficient to allow the volatile plasticizer to evaporate or diffuse out at body temperature. This causes the inner surface to set to the shape of the sclera. It is apparent that the entire supporting portion may be softened by the use of ethyl acetate or the like prior to placing it on the eye, so that, when in position on the eye, the said portion 7 may assume the shape of the sclera as well as the inner contacting surface of the lid of the eye. It is to be understood that the eye is treated with a liquid such as an isotonic salt solution, containing a local anesthetic such as butyn or the like, prior to placing the lens to be fitted thereon.

If desired, as illustrated in Fig. IV, the entire internal surfaces of the central visual portion 2 and supporting portion 7 may be provided with a layer of partially polymerized material having the characteristics of methyl methacrylate, in which instance the layer assumes the shape of the corneal portion 5 and scleral portion 10 of the eye. It is to be understood that the material of the layer 9 has substantially the same index of refraction as the cornea portion 5. The lens having the shaped layer 9 may be removed from the eye and polymerization of said layer thereafter completed, or the said layer may have characteristics which will cause the polymerization to be completed when in the eye.

If desired, the layer 9, adjacent the meeting edges of the visual portion 2 and supporting portion 7, may be etched or cut to form suitable clearances 12.

If desired, as illustrated in Fig. V, only the inner surface 11 of the central portion 2 may be provided with a layer 9 which is impressionable to the contour shape of the cornea 5. In this instance, the supporting portion 7 has a slightly spaced relation with the sclera portion of the eye so that the only part of the lens 1 which has an intimate fit with the eye is the area extending throughout the central visual portion 2. It is to be understood that the contour edges of the layer 9 may be rounded and smoothed as desired. The layer 9, in the above instance, does not interfere or detract from the visual characteristics of the lens because of its natural clearness, and the thinness of the layer used.

It is to be understood that in forming such lenses the supporting portion 7 is first shaped substantially to the general contour shape of the sclera of the eye, and that the layer 9 is adapted only to compensate for slight irregularities which exist in eyes of different individuals, so that the portion 7 or the central portion 2, as the case may be, may be intimately fitted with the portion of the eye with which they engage. This causes an even pressure to be distributed throughout the contacting area with the eye, so that a more intimate and comfortable fit is obtained.

From the foregoing description it will be seen that simple, efficient and economical means and processes have been provided for accomplishing all of the objects and advantages of the invention. The use of a transparent material, such as methyl methacrylate, for the central portion 2 and supporting portion 7 of the lens causes the lens to be exceptionally light in weight and resistant to impact and possible fracture.

The materials used in forming the lens are resistant to acids and are also resistant to corrosion and tarnish, and have no irritating characteristics.

With any of the above methods the resultant lens will have a thin inner layer shaped to have an intimate contact with the eye, that is, either with the scleral portion or with the corneal portion, or both, and its characteristics will be such as to retain its shape.

It is to be noted that the inner layer 9, as illustrated in Fig. II, has a substantially annular shape and that the inner layer 9 in Fig. V has a substantially circular contour.

The groove or channel 12 is of annular shape and may be formed by etching with a suitable acid or solvent or by a suitable grooving or cutting tool. The edges of all the surfaces may be rounded or smoothed, as desired, so that any excess material which might ooze out from the desired contour shape may be removed.

The above method of fitting the lens to the eye has been described as exerting a pressure on the lens, when in the eye, to cause the layer 11 to assume the shape of the portion of the eye engaged so as to obtain a substantially intimate fit with the scleral portion of the eye, corneal portion or both.

It has been found, from past experience, that in some cases there are individuals who cannot comfortably make use of a lens which is too intimately fitted with the eye. This may be due to the fact that in some instances when the eye is moved by the internal, external, superior or inferior rectus muscles, or motive muscular structure of the eye, the outer surface of the sclera portion of said eye may change slightly in shape, thereby requiring a suitable clearance at different portions throughout the internal eye engaging surface of the contact lens. This is in order to avoid undue pressure and/or friction irritation and so forth which might result through such deformations of the eye. This means that a portion of the sclera of the eye, when in one position, may have a slightly different contour shape than when the eye is in a different position. It may be desirable, therefore, to provide means for compensating such changes.

One method of accomplishing this result may be as follows:

The lens having a soft and pliable surface 9 may be placed in engagement with the eye. Pressure is first exerted to cause the deformable layer 9 to assume the contour shape of the portion of the eye which the said surface engages when the eye is in one position. The patient is then asked to move the eye in a direction simulating movement thereof when in normal use. Such movements being for the purpose of causing the internal surface of the deformable layer 9, which has been shaped to the contour shape of the eye when in a fixed position, to be altered slightly from said shape according to the shape which takes place in the surface shape or contour of the sclera portion of the eye during said movement.

If the surface 9 engages the cornea of the eye similar procedure is followed to compensate for the surface change which might take place during movement of the eye.

It is apparent that the lens, although substantially initimately fitted with the eye, will be slightly altered by said eye movements and the fit thereon will not be as intimate as though formed with the eye held in one position.

The inner surface 9, as previously stated above, is adapted to fit and retain said shape.

If desired, to confine the flow of the inner surface 9 during the fitting thereof to the eye, the inner surface adjacent the outer peripheral edge of the sclera portion of the lens may be provided with a relatively thin coating of latex to form an inner annular like member for preventing outward flow of the surface 9 during its shaping to the portion of the eye with which it engages. This annular member is adapted to cooperate with the inner coating of latex over the inner surface 11 of the main lens portion and is formed thinner than the thickness of the coating 9 so as to allow the said surface to freely assume the shape of the portion of the sclera of the eye with which it engages. After the layer 9 has been formed and set to the shape of the eye the coating of latex over the inner surface 11 and adjacent the peripheral edge of said inner surface may be removed. Any remaining undesirable sharp edges may be thereafter smoothed off.

From the foregoing description it will be seen that, with applicant's method, the lens may be very intimately or substantially intimately fitted with the eye, and that the fit of the lens with the eye is automatically obtained by the self-shaping characteristics of the inner layer 9 or deformable surface provided on the interior of the contact lens either throughout the sclera or corneal portion alone or both.

It is also to be understood that any of the steps of the method set forth above may be used to accomplish the results desired.

Having described our invention, we claim:

1. An ophthalmic lens of the contact type comprising a central visual portion of transparent lens medium and a surrounding supporting portion of transparent lens medium having an inner surface shaped substantially to the general contour shape of the scleral portion of the eye on which said portion is adapted to be supported and a relatively thin layer of synthetic resinous material having the characteristics of polymeric methyl methacrylate of the type having a clear transparent moldable water and acid resisting nature secured to an inner surface of at least one of said portions of the contact type lens initially in a partially polymerized state having the property of being impressable when in said state substantially to the irregularities of the contour of the surface of the eye with which said layer engages under conditions of use and being permanently shaped and adapted to retain said irregularities through further polymerization of said initially partially polymerized layer.

2. An ophthalmic lens of the contact type comprising a central visual portion of transparent lens medium and a surrounding supporting portion of transparent lens medium having an inner surface shaped substantially to the general contour shape of the scleral portion of the eye on which said portion is adapted to be supported and a relatively thin layer of polymeric methyl methacrylate of the type having a clear transparent moldable water and acid resisting nature secured to an inner surface of at least one of said portions of the contact type lens initially in a partially polymerized state having the property of being impressable when in said state substantially to the irregularities of the contour of the surface of the eye with which said layer engages under conditions of use and being permanently shaped and adapted to retain said irregularities through further polymerization of said initially partially polymerized layer.

3. An ophthalmic lens of the contact type comprising a central visual portion of transparent lens medium and a surrounding supporting portion of transparent lens medium having an inner surface shaped substantially to the general contour shape of the scleral portion of the eye on which said portion is adapted to be supported and a relatively thin layer of synthetic resinous material having the characteristics of polymeric methyl methacrylate of the type having a clear transparent moldable water and acid resisting nature plasticized with a volatile plasticizer secured to an inner surface of at least one of said portions of the contact type lens initially in a softened state having the property of being impressable when in said state substantially to the irregularities of the contour of the surface of the eye with which said layer engages under conditions of use and being permanently shaped and adapted to retain said irregularities through evaporation or diffusion of the volatile plasticizer.

LOUIS L. GAGNON.
HAROLD R. MOULTON.